Figure 1:
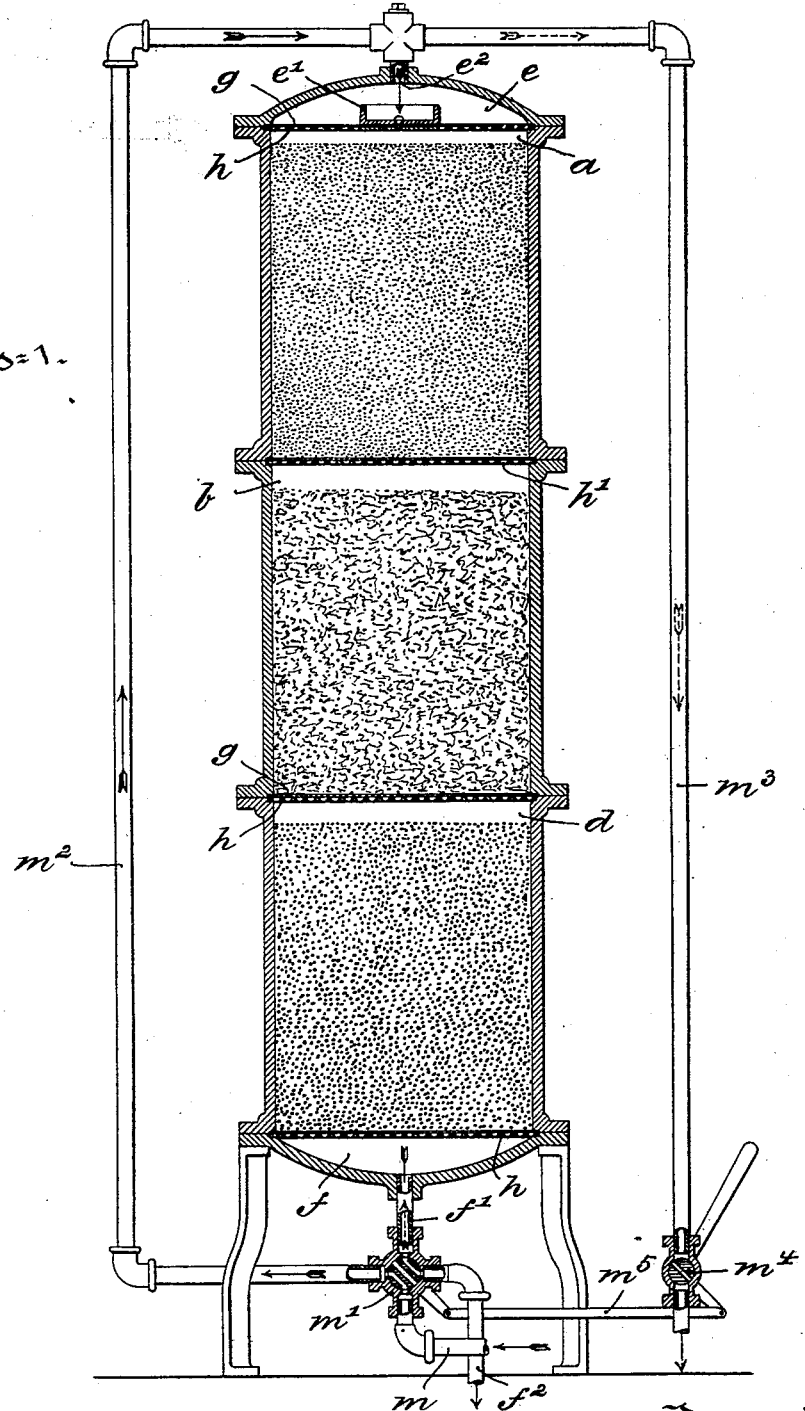

No. 630,870. Patented Aug. 15, 1899.
V. C. DRIESBACH.
FILTERING APPARATUS.
(Application filed Apr. 28, 1899.)
(No Model.) 2 Sheets—Sheet 1.

Witnesses:
Thomas M. Smith.
Richard C. Maxwell

Inventor:
Victor C. Driesbach,
By J. Walter Douglass
Attorney.

No. 630,870. Patented Aug. 15, 1899.
V. C. DRIESBACH.
FILTERING APPARATUS.
(Application filed Apr. 28, 1899.)
(No Model.) 2 Sheets—Sheet 2.
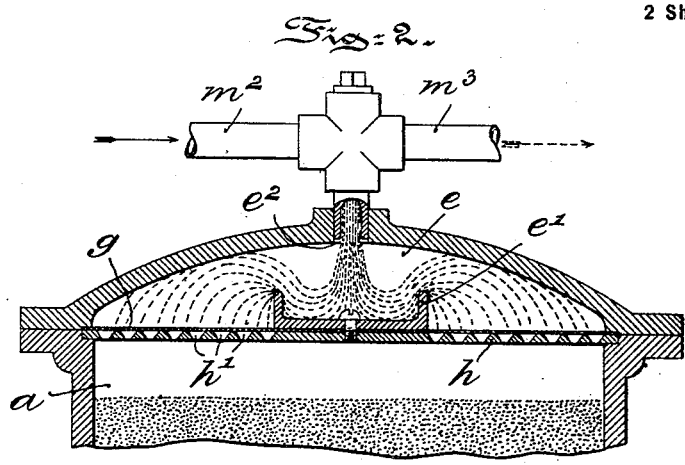
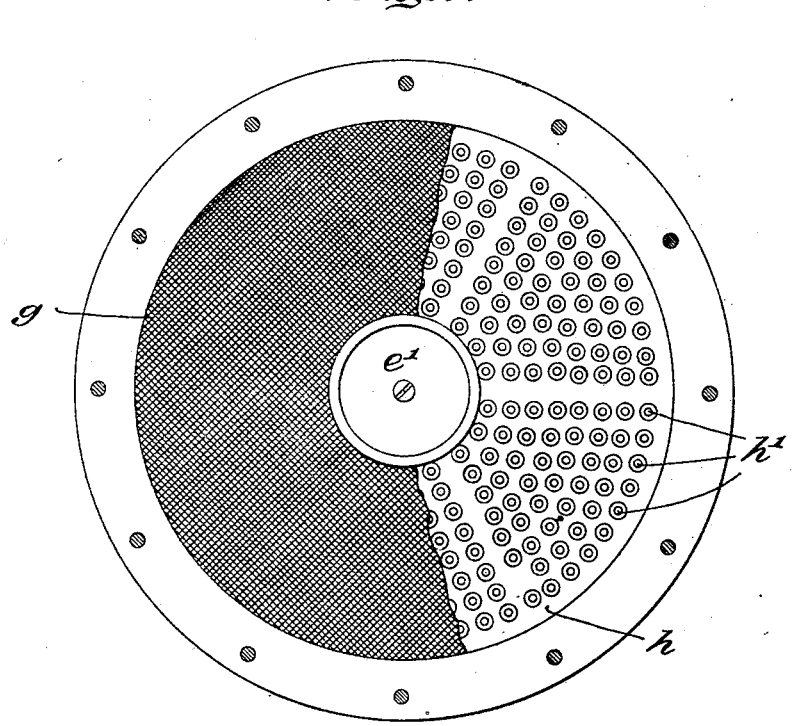

UNITED STATES PATENT OFFICE.

VICTOR C. DRIESBACH, OF PHILADELPHIA, PENNSYLVANIA.

FILTERING APPARATUS.

SPECIFICATION forming part of Letters Patent No. 630,870, dated August 15, 1899.

Application filed April 28, 1899. Serial No. 714,789. (No model.)

*To all whom it may concern:*

Be it known that I, VICTOR C. DRIESBACH, a citizen of the United States, residing at the city of Philadelphia, in the county of Philadelphia and State of Pennsylvania, have invented certain new and useful Improvements in Filtering Apparatus, of which the following is a specification.

My invention has relation to an apparatus for filtering water or other liquids, and in such connection it relates more particularly to the construction and arrangement of such an apparatus.

The principal objects of my invention are, first, to provide a simple, comparatively inexpensive, and easily-operated apparatus for the filtering of water; second, to provide in such an apparatus a series of superposed compartments containing the filtering material in conjunction with a liquid-inlet compartment below which the filtering-compartments are arranged, said inlet-compartment being provided with means whereby the liquid is broken up or finely distributed and aerated prior to passing through the filtering-compartments, and, third, to provide in such an apparatus means whereby the apparatus may be quickly and thoroughly cleaned.

My invention, stated in general terms, consists of a filtering apparatus constructed and arranged in substantially the manner hereinafter described and claimed.

The nature and scope of my invention will be more fully understood from the following description, taken in connection with the accompanying drawings, forming part hereof, in which—

Figure 1 is a vertical sectional view of a filtering apparatus embodying the main features of my invention, the pipe connections and cleaning mechanism being illustrated partly in elevation and partly in section. Fig. 2 is an enlarged vertical sectional view of the upper or inlet section of the filtering apparatus; and Fig. 3 is an enlarged top or plan view of the filtering apparatus, partly broken away to more clearly illustrate certain parts of the said apparatus.

Referring to the drawings, the filter comprises a series of superposed compartments $a$, $b$, and $d$, above the upper compartment $a$ of which is arranged the water-inlet compartment $e$. In each compartment $a$ or $b$ or $d$ is placed appropriate filtering material or media, which material is usually quartz or coarse sand for the compartment $a$, a clarifying compound or agent for the compartment $b$, and charcoal or similar purifying agent for the compartment $d$. Below the compartment $d$ is arranged a collecting-compartment $f$, from which the purified and filtered liquid is drawn off through the pipe $f'$. Each compartment $a$, $b$, and $d$ is separated from the adjacent compartments by, first, a screen-plate $g$ of fine netting or wire, and, second, a perforated supporting-plate $h$ of sheet metal, the perforations $h'$ of which are reversely conical, as illustrated in Figs. 2 and 3. In the inlet-compartment $e$ and upon the plates $g$ and $h$ is located a box or trough $e'$, arranged directly below the water-inlet $e^2$ to the compartment $e$. The function of this box or trough $e'$ is to receive and deflect the water issuing from the inlet $e^2$, so that the same is intimately mingled with air and thoroughly broken up into fine particles before it passes through the netting $g$ and plate $h$. The advantages of such a construction are mainly that the water is properly aerated and is delivered to the whole surface of the screen-plate instead of being precipitated upon a portion only.

The preferred arrangement of pipes, as well as the preferred manner of cleaning the filter, is illustrated in Fig. 1. The water or service pipe $m$ terminates in a four-way valve $m'$, which when turned as indicated in Fig. 1 permits the water to pass by the pipe $m^2$ to the top of the filter and to enter by the inlet $e^2$. After being filtered the water passes out of the base of the filter by the pipe $f'$ and through the valve $m'$ to the offtake-pipe $f^2$. From the inlet $e^2$ extends a branch pipe $m^3$, controlled by a valve $m^4$. The handles of the valves $m'$ and $m^4$ are connected together by a link $m^5$ in such a manner as that when the valve $m^4$ is closed the valve $m'$ is turned so that a connection is made between the pipes $m$ and $m^2$ and pipes $f'$ and $f^2$. When, however, the valve $m^4$ is opened, the valve $m'$ is turned so that the connection of the pipe $m$ with the pipe $m^2$ and the pipe $f'$ with the pipe $f^2$ is closed and the following new connections are made: The pipe $m$ is connected directly with the outlet-pipe $f'$ and water is forced through the filter in a reverse direction, escaping through the inlet $e^2$ and passing out by the pipe $m^3$ into a sewer or other receptacle therefor.

Having thus described the nature and objects of my invention, what I claim as new, and desire to secure by Letters Patent, is—

1. In a filtering apparatus, a series of superposed filtering-compartments, an inlet-compartment arranged above the filtering-compartments, a screen-plate of fine netting and a plate having reversely conical perforations and located below the screen-plate and both plates adapted to separate the inlet-compartment from the first in series of filtering-compartments, and a box or trough supported by said screen and perforated plates directly beneath the inlet of the inlet-compartment, said box or trough adapted to receive and break up the liquid prior to its delivery to the screen and perforated plates, substantially as and for the purposes described.

2. In a filtering apparatus, a series of superposed filtering-compartments, an inlet-compartment arranged above the filtering-compartments, a screen-plate adapted to separate the inlet-compartment from the first in series of filtering-compartments, a box or trough supported by said screen-plate and adapted to receive and break up the liquid prior to its delivery to the screen-plate, a collecting-compartment located below the filtering-compartments, a water-supply pipe having a connection to the inlet-compartment, an outlet-pipe leading from the collecting-compartment, an offtake-pipe and a valve adapted when turned in one direction to open communication between the water-supply pipe and inlet-pipe and between the outlet and offtake pipes and when turned in an opposite direction to open direct communication between the water supply and outlet pipes to clean the filter, substantially as and for the purposes described.

In testimony whereof I have hereunto set my signature in the presence of two subscribing witnesses.

VICTOR C. DRIESBACH.

Witnesses:
J. WALTER DOUGLASS,
RICHARD C. MAXURE.